US010922137B2

(12) United States Patent
Cai et al.

(10) Patent No.: US 10,922,137 B2
(45) Date of Patent: Feb. 16, 2021

(54) DYNAMIC THREAD MAPPING

(71) Applicant: Hewlett Packard Enterprise Development LP, Houston, TX (US)

(72) Inventors: Qiong Cai, Palo Alto, CA (US); Charles Johnson, Palo Alto, CA (US); Paolo Faraboschi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 16/073,573

(22) PCT Filed: Apr. 27, 2016

(86) PCT No.: PCT/US2016/029635
§ 371 (c)(1),
(2) Date: Jul. 27, 2018

(87) PCT Pub. No.: WO2017/188948
PCT Pub. Date: Nov. 2, 2017

(65) Prior Publication Data
US 2019/0034239 A1 Jan. 31, 2019

(51) Int. Cl.
*G06F 9/50* (2006.01)
*G06F 11/30* (2006.01)
(Continued)

(52) U.S. Cl.
CPC .......... *G06F 9/5016* (2013.01); *G06F 9/3851* (2013.01); *G06F 9/46* (2013.01);
(Continued)

(58) Field of Classification Search
CPC .. G06F 9/5016; G06F 9/5027; G06F 11/3017; G06F 9/4881; G06F 11/3471;
(Continued)

(56) References Cited

U.S. PATENT DOCUMENTS 6,549,930 B1    4/2003  Chrysos et al.
7,506,325 B2 *  3/2009  Brokenshire .......... G06F 9/322
                                                           717/140
(Continued)

OTHER PUBLICATIONS

Jin et al. "Memory Access Scheduling on the Convey HC-1", 2013 IEEE, p. 237.*
(Continued)

*Primary Examiner* — Van H Nguyen
(74) *Attorney, Agent, or Firm* — Law Firm of Timothy Myers

(57) ABSTRACT

In one example, a central processing unit (CPU) with dynamic thread mapping includes a set of multiple cores each with a set of multiple threads. A set of registers for each of the multiple threads monitors for in-flight memory requests the number of loads from and stores to at least a first memory interface and a second memory interface by each respective thread. The second memory interface has a greater latency than the first memory interface. The CPU further has logic to map and migrate each thread to respective CPU cores where the number of cores accessing only one of the at least first and second memory interfaces is maximized.

17 Claims, 6 Drawing Sheets

(51) Int. Cl.
G06F 12/1027 (2016.01)
G06F 9/38 (2018.01)
G06F 9/46 (2006.01)
G06F 9/48 (2006.01)
G06F 9/52 (2006.01)
G06F 12/0811 (2016.01)

(52) U.S. Cl.
CPC .......... G06F 9/4881 (2013.01); G06F 9/5027 (2013.01); G06F 9/52 (2013.01); G06F 11/30 (2013.01); G06F 12/0811 (2013.01); G06F 12/1027 (2013.01); *G06F 2212/1024* (2013.01); *G06F 2212/684* (2013.01)

(58) Field of Classification Search
CPC ...... G06F 9/46; G06F 2201/885; G06F 11/30; G06F 2212/1024; G06F 9/3851; G06F 2201/88; G06F 11/3409; G06F 2212/684; G06F 9/52; G06F 12/0811; G06F 12/1027
See application file for complete search history.

(56) References Cited

U.S. PATENT DOCUMENTS

| | | | |
|---|---|---|---|
| 7,930,574 B2* | 4/2011 | Cai | G06F 1/3203 713/322 |
| 8,032,871 B2* | 10/2011 | Brokenshire | G06F 9/322 717/140 |
| 8,166,323 B2* | 4/2012 | Cai | G06F 1/3203 713/322 |
| 8,296,773 B2 | 10/2012 | Bose et al. | |
| 8,706,923 B2* | 4/2014 | Sankaran | G06F 13/28 710/22 |
| 8,806,491 B2 | 8/2014 | Cai et al. | |
| 8,832,403 B2* | 9/2014 | Ohmacht | G06F 9/3004 711/167 |
| 9,507,647 B2* | 11/2016 | Blumrich | G06F 9/524 |
| 10,042,750 B2* | 8/2018 | Roberts | G06F 12/0292 |
| 2006/0095901 A1* | 5/2006 | Brokenshire | G06F 9/322 717/151 |
| 2007/0294693 A1 | 12/2007 | Barham | |
| 2010/0268912 A1 | 10/2010 | Conte et al. | |
| 2010/0274972 A1* | 10/2010 | Babayan | G06F 9/3842 711/125 |
| 2011/0258420 A1 | 10/2011 | Devadas et al. | |
| 2013/0212594 A1 | 8/2013 | Choi et al. | |
| 2013/0262816 A1 | 10/2013 | Ronen et al. | |
| 2016/0092224 A1 | 3/2016 | Collura et al. | |

OTHER PUBLICATIONS

Membarth et al. "Automatic Optimization of In-Flight Memory Transactions for GPU Accelerators based on a Domain-Specific Language for Medical Imaging", 2012 IEEE, pp. 211-218.*
International Search Report & Written Opinion received in PCT Application No. PCT/US2016/029635, dated Jan. 24, 2017, 10 pages.
Petrucci, V. et al., "Energy-Efficient Thread Assignment Optimization for Heterogeneous Multicore Systems", (Research Paper), Jan. 2015, 26 pages.
Cai et al., "Thread Shuffling: Combining DVFS and Thread Migration to Reduce Energy Consumptions for Multi-core Systems", IEEE, 2011, pp. 379-384.

* cited by examiner

DYNAMIC THREAD MAPPING

BACKGROUND

Moore's law has been successful in allowing a central processing unit (CPU) to roughly double its performance every 2 years by allowing transistor gate sizes to be reduced by shrinking semiconductor lithography thus allowing for increased clocking. However, even as quantum mechanical limitations now restrict the ability of semiconductor companies to continue to shrink their semiconductor lithography, the performance of processors has still continued to improve due to numerous architectural changes such as adding larger and more levels of cache memory and having multiple cores with multiple execution units that allow several software threads to be processed by a single CPU die. In order to take advantage of this simultaneous multi-threading (SMT) capability, operating systems have had to be re-written thereby increasing the software overhead that is required to manage the assignment of threads. This software overhead subtracts from the potential increased performance that SMT might provide.

BRIEF DESCRIPTION OF THE DRAWINGS

This disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

Modern CPU have multiple core CPUs each with multiple threads. Further, new CPU architectures have segregated memory accesses into different memory types that are characterized with different latencies. For instance, new memory centric architectures may have large portions of local and non-local memory accessible via a memory fabric with large latencies and a smaller portion of local memory directly connected to the CPU, such as DRAM with low latencies. These CPU cores may have limited load/store buffers and thus large amounts of accesses to memory on the memory fabric may cause a CPU to starve its access to DRAM memory, thereby causing the CPU performance to slow down while it awaits the completion of the fabric memory accesses.

To improve overall CPU performance, in one example, a set of hardware registers for each thread is used to keep track of the number of load and/or stores to each type of low and large latency memory accesses thereby allowing for classification in hardware during CPU runtime each thread as a low latency only, a large latency only, or a mixed latency thread, which are identified by their location in physical address space. Periodically over a predetermined number of CPU clock cycles, hardware or software logic may be used to dynamically assign and migrate like classified threads to the same CPU cores such that the number of cores with only one type of memory accesses (low or large latency) is maximized. Dynamic voltage and frequency scaling (DVFS) may then be performed on the individual cores to increase the performance of cores with low latency memory accesses and decrease the performance of cores with large latency memory accesses thereby increasing the overall performance of the CPU both through the dynamic thread mapping and the DVFS tweaking.

Figure 1:
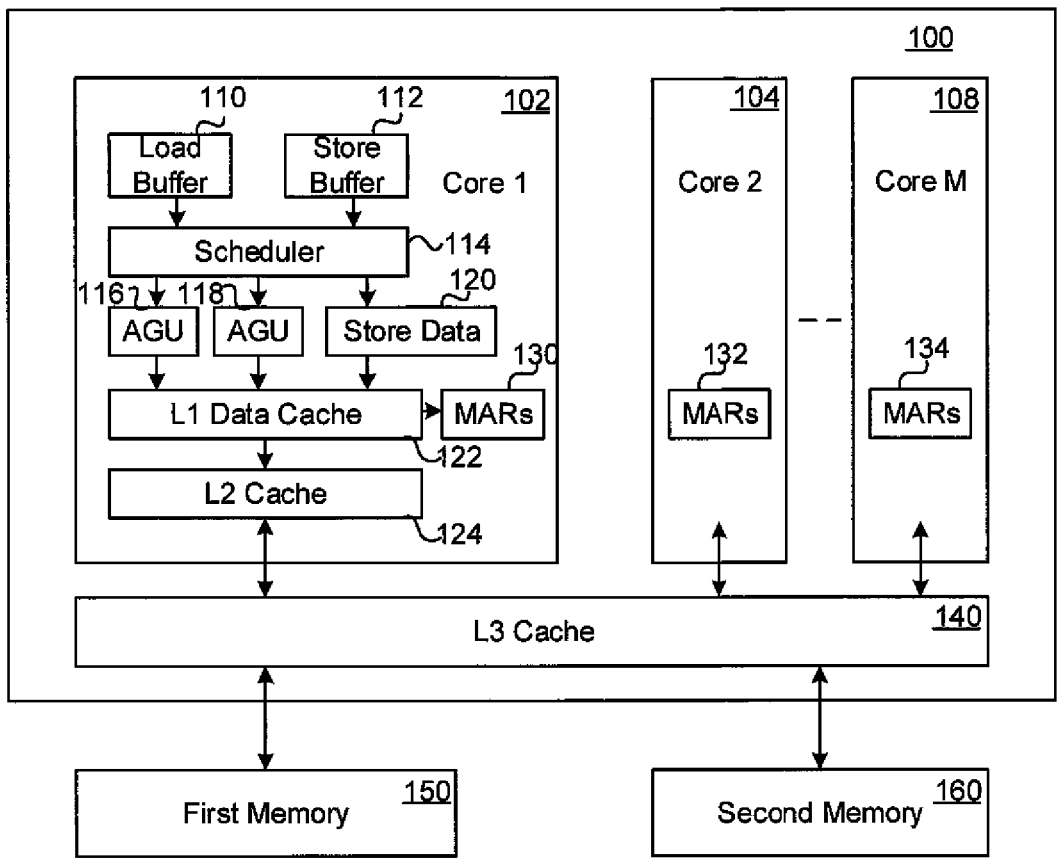
FIG. 1 is a block diagram of an example first CPU having memory access registers to track memory accesses to different types of memory.

FIG. 1 is a block diagram of an example first CPU 100 having memory access registers to track memory accesses to different types of memory. The different types of memory can be based on their physical addresses and/or their access times, such as their latency characteristics. In some examples, there may be two different types of memories. In other examples, there may be more than two different types of memories. In this particular example, the CPU 100 is a multi-core simultaneous multi-threaded (SMT) (also known as hyper-threaded in Intel™ processors) that incorporates memory access registers 130-134 to allow for dynamic thread mapping within the multiple SMT CPU cores 102-108 to optimize CPU performance in a memory hierarchy of first memory 150 and second memory 160 wherein the first memory 150 has a shorter latency than the second memory 160. SMT allows an operating system (OS) to view each of the hardware threads within a core as a virtual or logical core. The main purpose of SMT is to increase the number of independent instructions with a CPU instruction pipeline. That is, one physical core appears as two or more processors to an OS to allow for concurrent scheduling of two or more software processes (software threads) per physical core. Each logical processor has its own architectural state and may be individually halted, interrupted, or directed to execute a specified software thread, independent from the other logical processor or hardware thread sharing the same physical core. Thus, each hardware thread or hardware context in a SMT core may execute a separate software thread as determined by an OS. A program executing instructions by a processor such as CPU 100 may contain three or more types of software threads categorized by how the threads access memory space as:

1) a directly connected local memory (typically DRAM) only thread containing all local first memory 150 accesses;
2) a fabric memory (FAM) only thread containing all non-local second memory 160 accesses; and
3) a mixed-thread containing not only local first memory 150 accesses but also non-local second memory 160 accesses.

The CPU 100 may contain M cores 102-108 each with an L1 data cache 112 and L2 cache 124 that are private to each of the respective CPU cores 102-108. CPU 100 may also in some examples include an L1 instruction cache (not shown). An L3 cache 140 may be shared among the multiple CPU cores 102-108. Each CPU core 102-108 may include a load buffer 110 and a store buffer 112 that are coupled to a scheduler 114, known also sometimes as a memory ordering buffer. As the CPU 100 executes instructions, the various data load and stores from/to memory are first allocated in the load buffer 110 and store buffer 112, respectively. The load buffer 110 and store buffer 112 may check for data dependencies amongst memory operations and determine when to issue memory operations such that the memory ordering is guaranteed to be correct when entering the scheduler 114. The scheduler 114 may be further coupled to a first address generation unit (AGU) 116 and a second AGU 118.

The AGUs 116-118 execution units may compute the effective address for the memory load and stores, whereas a Store Data unit 120 may write the data from the respective core 102-108 to the L1 data cache 112. After obtaining the effective virtual address for a given load/store operation, the core looks within the translation lookaside buffer (TLB) (not shown) to get the actual physical address for the paged or segmented virtual memory. The L1 data cache 112, the L2 cache 124, and L3 cache 140 are each checked subsequently to determine whether there is any data in any of the caches. If all lookups in the various caches are misses (data not present in cache), then the CPU 100 issues a memory request to the first memory 150 or the second memory 160, depending on the physical address. The physical address is known after a translation lookaside buffer (TLB) access is resolved or an L1 cache (instruction or data cache) is accessed and may be monitored and tracked.

In this example in FIG. 1, the first memory 150 has a lesser latency than the second memory 160. Latency is the time delay required for the memory to store or load data from the memory and there may be different latencies for load and store operations and even different latencies depending on the address location or whether the first memory 150 or second memory 160 have cache subsystems. In one example, the first memory 150 is dynamic random access memory (DRAM) connected to the local direct memory bus of the CPU 100 and the non-local second memory 160 is a mass storage memory, such as flash, non-volatile random access memory (NVRAM), hard drives, and the like coupled to CPU 100 via a fabric memory (FAM) interface, also known as a memory fabric stop.

A CPU 100 that has a FAM interface architecture allows for multiple computing nodes, such as CPUs 100 and graphical processing units (GPUs) (not shown), such as video controllers, to address any address location in a pool of memory. The FAM interface converts loads and stores from the CPU 100 to memory packets of data understood by the memory fabric interface. For instance, in a non-uniform memory access (NUMA) multiprocessor architecture memory access time depends on the memory location relative to the processor. Under NUMA, a processor may access its own local memory faster than non-local memory that may be local to another processor or memory shared between processors.

The latency differences between the first memory 150 and the second memory 160 can be quite different. In one example where the first memory 150 is DRAM and the second memory 160 is a storage technology connected to a FAM interface, the latency difference may be a large as 3 times to 10 times depending on the FAM memory technology and the FAM network topology. This larger latency for the second memory 160 may create a resource starvation problem in the cache and memory hierarchy preventing any first memory 150 memory accesses, such as when DRAM is used for the first memory 150 as DRAM has very little latency. Accordingly, the forward progress may not be guaranteed for a physical core that has this resource starvation problem.

This lack of guarantee is because the load buffers 110 and store buffers 112 are typically designed assuming first memory 150 DRAM access latency and the typical sizes of the load and store buffers to not take into account the second memory 160 FAM latency. If the code executing on a particular CPU 100 core 102-108 happens to have bursty FAM accesses, at least one of the load buffers 110 and store buffers 112 may be used up quickly and it may take a long time (typically microseconds) for the CPU 100 to retire these FAM operations. By having at least one of the load buffers 110 and the store buffers 112 filled, any new allocation of loads or stores, respectively, may be prevented from going to the first memory 150 DRAM memory. This problem will affect any processor-based system where the load/store buffers are being shared between hardware contexts. High performance of CPU 100 is impacted particularly when there is no latency discrimination across sufficiently distinct memory latencies to depopulate these load buffers 110 and store buffers 112 for the lower latency memory accesses.

One possible solution to this problem may be to use a software pinning mechanism by the OS so that a thread containing all first memory 150 accesses and a hardware containing all second memory 160 accesses are mapped to execute in two separate CPU cores 102-108. However, this software pinning mechanism is not flexible and does not use the CPU 100 resources effectively when a thread contains a mixed sequence of memory accesses to both the first memory 150 and the second memory 160, which has a larger latency than the first memory 150. This is because hardware contexts (one of the hyper-threads) running second memory-only classified threads or mixed classified threads are stalled most of the time due to the long latency of the second memory 160.

On the other hand, a better solution described within this disclosure is to group the same types of software threads by memory access categorization into the same core using dynamic-thread mapping with hardware based memory access registers (MARs) 130-134 to monitor each thread's memory accesses. The MARs 130-134 contain for each hardware context a set of thread-specific counters/registers (which may be architecturally visible to the OS) that represent the number of in-flight first memory 150 loads and stores and in-flight second memory 160 loads and stores. Although for ease of discussion, only first memory 150 and second memory 160 are described, in some examples, there may be three or more memories that are tracked and monitored, each with their own set of MARs. For instance, there may be multiple types of memory accessible by CPU 100 such as DRAM, NVRAM, directly attached disk storage, local network based storage, and cloud based storage, each having different memory access latencies. Further, the MARs may be configured differently in various examples.

In one example, there are separate counters/registers for first memory 150 loads and stores and separate counters/registers for second memory 160 loads and stores. In another example, there may a single counter/register for both first memory 150 loads and stores and a single counter/register for both second memory 160 loads and stores. In other examples, there may be a single counter/register for both first memory 150 loads and stores and separate counters/registers each for second memory 160 loads and stores. In yet other examples, there may be multiple sets of counters/ registers for loads and stores to various memory locations of the first memory 150 and second memory 160 accesses. Because first memory 150 and second memory 160 address spaces are typically separate, a portion of the physical address bits can be used to distinguish whether a load or a store access is to first memory 150 or second memory 160. The counters/registers are incremented when the physical address of a memory access is known. This typically happens when a load/store operation accesses the L1 cache (instruction or data cache) in a core pipeline or after the TLB (translation lookaside buffer) access is resolved. After a memory operation for the respective core is committed, its corresponding counter may be decremented. Accordingly, the counters/registers may keep track of the past history or pending memory load/stores for the first memory 150 and second memory 160 for each thread allowing a respective thread to be classified as first memory only type (e.g. DRAM_ONLY), second memory only type (e.g. FAM_ONLY), or mixed memory type (e.g. MIXED) threads.

Figure 2:
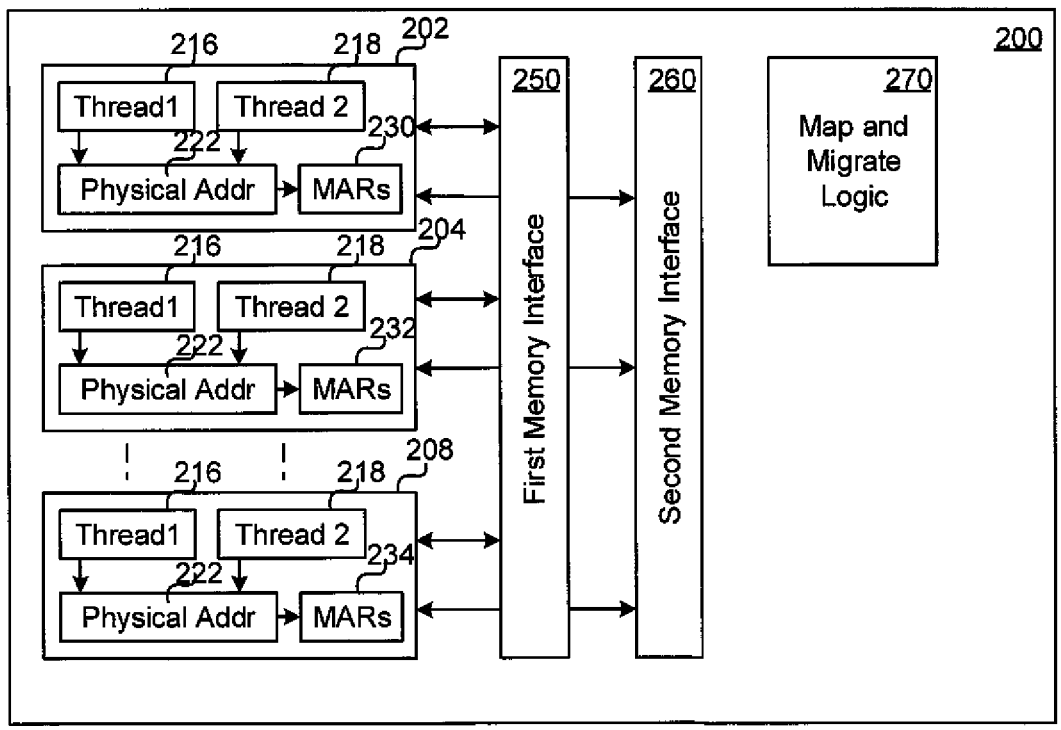
FIG. 2 is a block diagram of an example second CPU having multiple SMT cores each having multiple hardware threads or contexts.

FIG. 2 Is a block diagram of an example second CPU 200 with dynamic thread mapping having multiple SMT cores 202-208 each having multiple hardware threads or contexts 216, 218 that access in-flight memory requests to physical addresses 222 when load/store accesses to a first memory interface 250 and a second memory interface 260 are requested by code executing on either or both of the hardware threads 216, 218. The tracking of the physical addresses of different levels of memories are known after the TLB (translation lookaside buffer) access is resolved or an L1 cache (instruction or data cache) is accessed. In some examples, there may be more than two memory interfaces. In each of the SMT cores 202-208, there are a set of respective MARs 230-234 that keep track of the number of pending first memory interface 250 and second memory interface 260 load/store operations to classify the type of thread memory operation. In one example, the first and second sets of respective MARs 230-234 may be visible to software executing on the CPU and do not track any number of memory accesses generated by the CPU due to at least one of loads for translation look-aside buffer misses and writes due to evictions from the L1 cache. The respective set of MARs 230-234 may be segregated by load from and stores to at least a first memory interface 250 and a second memory interface 260. The tracking for each thread may be done by operating a first set of respective MARs 230 for each thread for tracking at least one of loads and stores to the first memory 250 and by operating a second set of respective MARs 230 for tracking at least one of loads and stores to the second memory 260. Also included in CPU 200 is map and migrate logic 270, implemented by way of software or hardware or various combinations thereof, to assign (map) the various threads to particular cores 202-208 such that the number of physical cores that are executing hardware threads of the same type of memory access is maximized. The map and migrate logic 270 for each thread 216, 218 may also include logic to classify threads with only first memory interface 250 accesses, threads 216, 218 with only second memory interface 260 accesses, and threads 216, 218 with both first and second memory interface access during runtime of the CPU 200 without associated software executing on the CPU 200. The map and migrate logic 270 for each thread 216, 218 may allow for dynamic thread isolation for both multi-threaded and multi-programmed parallel applications executing on the CPU 200. CPU 200 may include logic to adjust the voltage and frequency (not shown) of the CPU cores 202-208 to maximize performance of the cores 202-208 with only accesses to the first memory interface 250. The map and migrate logic 270 for each thread 216, 218 and the logic to adjust the voltage and frequency may be performed periodically over a predetermined period of CPU clock cycles.

Figure 3:
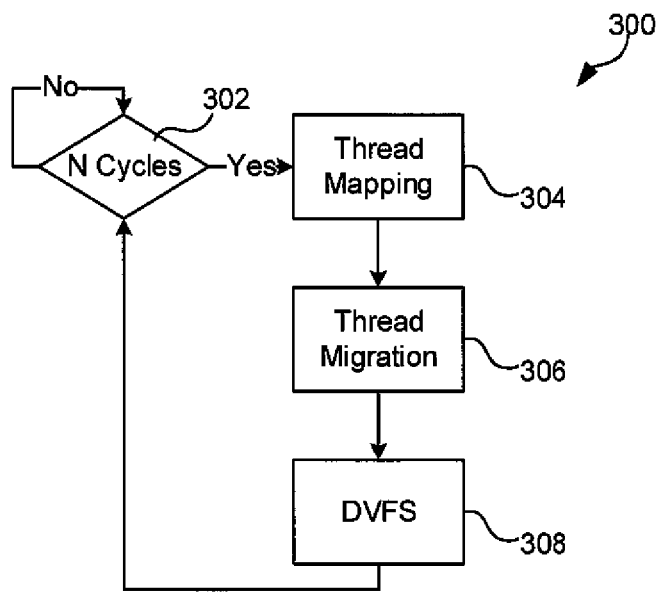
FIG. 3 is a flowchart of the overall dynamic thread mapping flow in one example.

FIG. 3 is a flowchart 300 of the overall dynamic thread mapping flow in one example. In decision block 302, a check is made whether N CPU clock cycles have occurred. If not, then the counters/registers in MARs 230-234 continue to track and help classify the various hardware threads 216, 218 of the CPU 200 to monitor the number of pending outstanding loads and/or stores to both the first memory interface 250 and the second memory interface 260. In one example N may be 10000 cycles, in another example N may be 1 million, 5 million, 10 million or more cycles. In yet other examples, N may be adjusted depending on processor needs or based on OS requests to optimize performance. Once N CPU clock cycles have occurred, then in block 304 for each thread based on the classification based on the MARs 230-234 contents, the respective thread 216, 218 is mapped to a core 202-208 by assigning it to a core 202-208 with a like classified thread such that the number of cores executing threads of the same classification are maximized. After the various threads 216, 218 of CPU 200 are mapped (assigned) to the appropriate cores, in block 306 the various threads of CPU 200 are then migrated to the assigned respective mapped core.

A thread separation mechanism or controller may first generate a thread mapping table to map a thread originally running a hardware context (core, thread) to a new context mapping (core, thread). After the mapping is calculated, a controller does the thread migration. The thread separation controller may be implemented in software, hardware, or a combination thereof. Once the threads 216, 218 are migrated to the appropriate cores, then in block 308 dynamic voltage and frequency scaling (DVFS) may be implemented to increase the performance of cores that are executing threads accessing only the first memory interface 250 and decrease the performance of cores that are executing threads accessing only the second memory interface 260. Once the DVFS is completed, the controller returns to decision block 302 to wait another N CPU clock cycles before again reassigning and migrating the threads 216, 218.

In this manner, the flow in flowchart 300 allows for dynamic program behavior within the OS processes to be taken into account. That is, a particular thread 216, 218 may exhibit various phases with different memory performance characteristics during the whole running of the code executing on the thread 216, 218. For example, a thread 216, 218 may initially only have second memory interface 260 accesses, and then later both first memory interface 250 accesses and mixed memory interface accesses, and finally later still only second memory interface 260 accesses again. When using software pinning by an OS, it is very difficult to pin a thread having such dynamic memory behaviors but it can be readily achieved by the technique disclosed herein due to the hardware monitoring and tracking. Accordingly, the flow in flowchart 300 allows for continually tracking the various threads for different types of memory accesses and dynamically classifying, reassigning (or mapping) and migrating the assigned threads to appropriate cores with like type threads. In addition, enabling DVFS allows for increasing program performance and reduced power consumption of CPU 200.

Figure 4A:
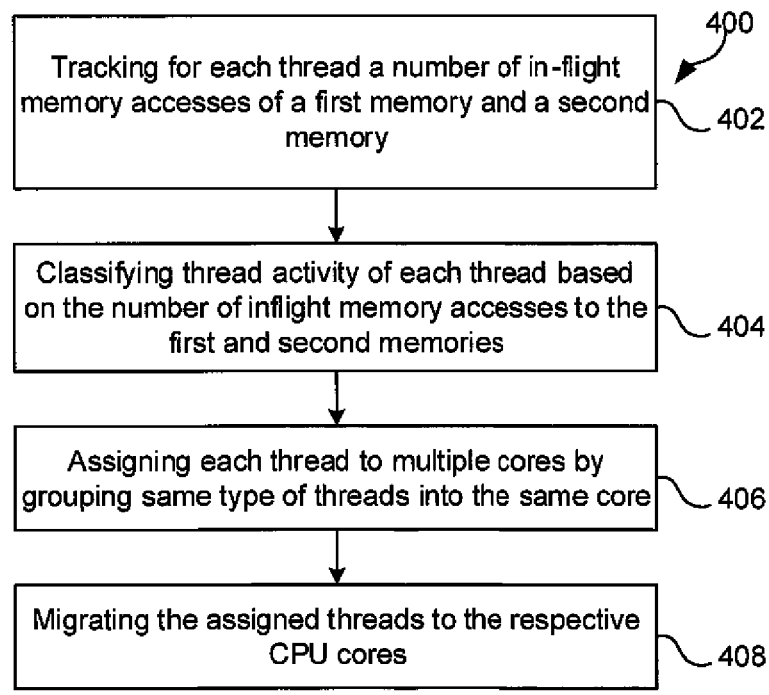
FIG. 4A is a flow chart of an example method of implementing thread mapping and thread migration in FIG. 3.

FIG. 4A is a flow chart 400 of an example method of implementing thread mapping of block 304 and thread migration of block 306 in FIG. 3. In block 402, for each hardware thread 216, 218 a number of in-flight memory accesses of at least a first memory having a first latency and of a second memory having a second latency is tracked. In-flight memory accesses are those memory accesses which are architecture-visible to code executing on the CPU 200 and do not contain any number of cache related memory accesses generated by the CPU 200 such as memory reads due to TLB misses or memory writes due to evictions. In block 404, the thread activity of each hardware thread 216, 218 is classified based on the tracked number of in-flight memory accesses to the first and second memories. In block 406 each hardware thread 216, 218 is assigned to a respective one of the multiple cores by grouping the same type of classified threads into the same cores as possible. In block 408, the assigned threads are then migrated to the respective assigned CPU cores.

Figure 4B:
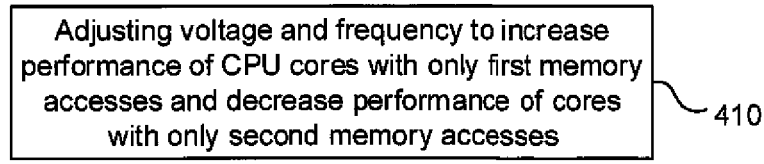
FIG. 4B is an example additional step of the flow chart in FIG. 4A that can be implemented to further optimize CPU performance.

FIG. 4B is an example additional step of the flow chart 400 that can be implemented to further optimize CPU performance. In block 410, the CPU cores with only first memory accesses may be increased in performance by adjusting the voltage and/or frequency higher using DVFS. Further, the power may be decreased in the CPU cores with only second memory accesses by decreasing the voltage and/or frequencies of those cores with DVFS.

Figure 5A:
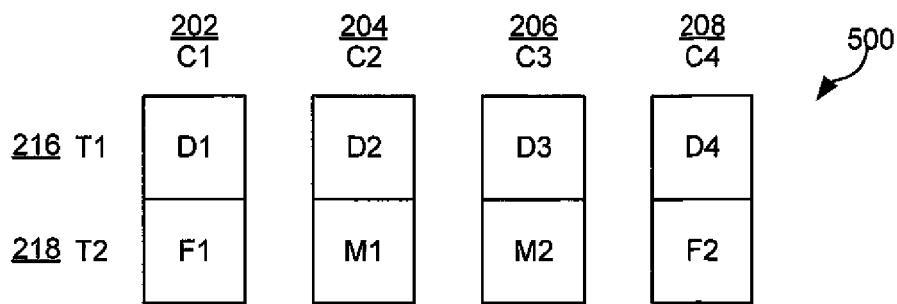
FIG. 5A is an example table after tracking before mapping and migration of threads.
Figure 5B:
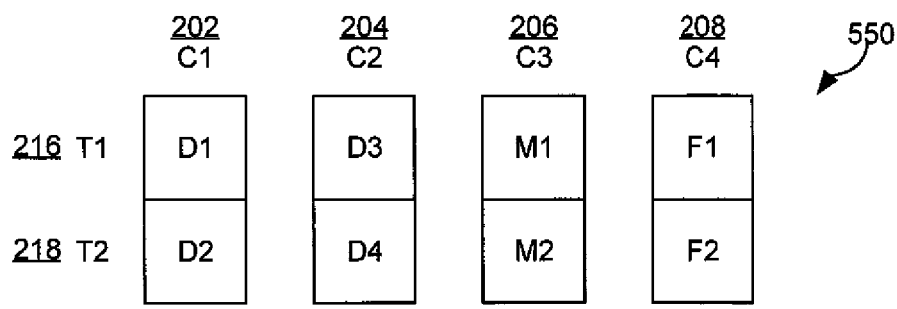
FIG. 5B is an example table after mapping of threads for each core.

FIGS. 5A and 5B are example tables 500 (after tracking before mapping and migration) and 550 (after mapping and migration) of hardware threads T1 216 and T2 218 for each core C1 202, C2 204, C3 206, and C4 208 (for an example 4 core/8 thread SMT CPU with DRAM for first memory and FAM for second memory) mapped to the cores by classification. The designation Dn represents a software thread classified as accessing only DRAM memory in the first memory interface, n being the first, second, third, and fourth respective thread. Fy represents a software thread classified as accessing only FAM memory in the second memory interface, y being the first and second respective threads. Mz represents a software thread classified as MIXED memory accessing both DRAM and FAM memory in the first and second memory interfaces, z being the first and second respective threads. During an N number of CPU clock cycles, the MARs counters/registers track the various number of each type of memory accesses. After N CPU clock cycles, in FIG. 5A, the first hardware thread T1 216 of each core is shown as each being classified as accessing only DRAM memory with designations D1-D4. In core C1 202, hardware thread T2 218 is classified as accessing FAM-only memory and designated as F1, as does hardware thread T2 218 of core C4 208 designated as F2. Cores C2 and C3 have their respective hardware thread T2 218 classified as accessing a mixture of both DRAM and FAM memory and designated M1 and M2, respectively.

FIG. 5B illustrates an example of the new mapping and migration of the various threads in FIG. 5A based on their classification in order to maximize the number of cores executing the same classification type. In core C1 202 and C2 204 both the T1 216 and T2 218 hardware threads are now assigned to be DRAM-only memory accesses software threads D1-D4. Core C3 206 has been assigned mixed memory access software threads M1 and M2 for the T1 216 and T2 218 hardware threads, respectively. Core C4 208 has been assigned F1 and F2 software threads that are accessing FAM-only memory for the T1 216 and T2 T218 hardware threads, respectively.

Figure 6A:
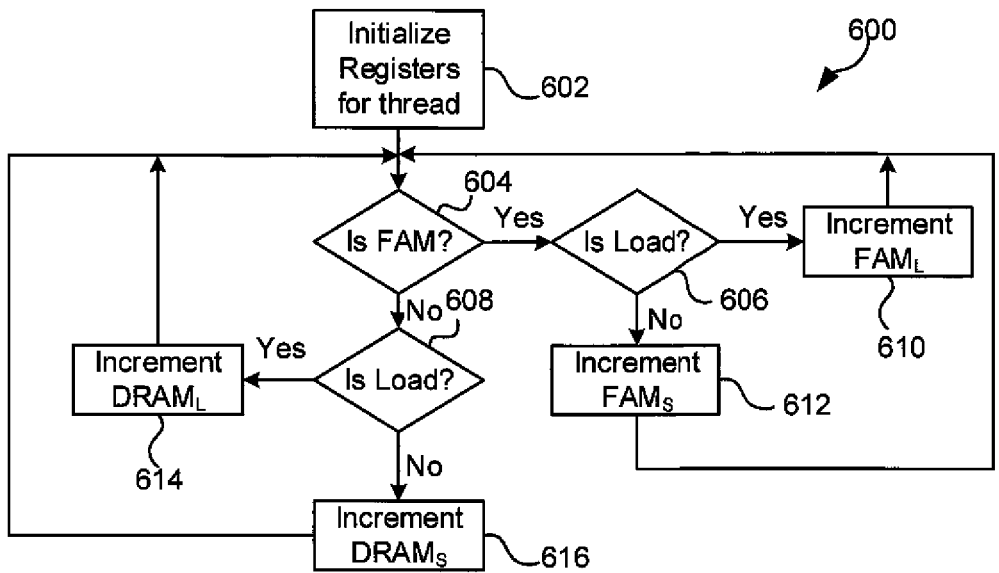
FIG. 6A is a flowchart of example logic to implement the tracking and classification for each of the hardware threads of each core of a CPU.
Figure 6B:
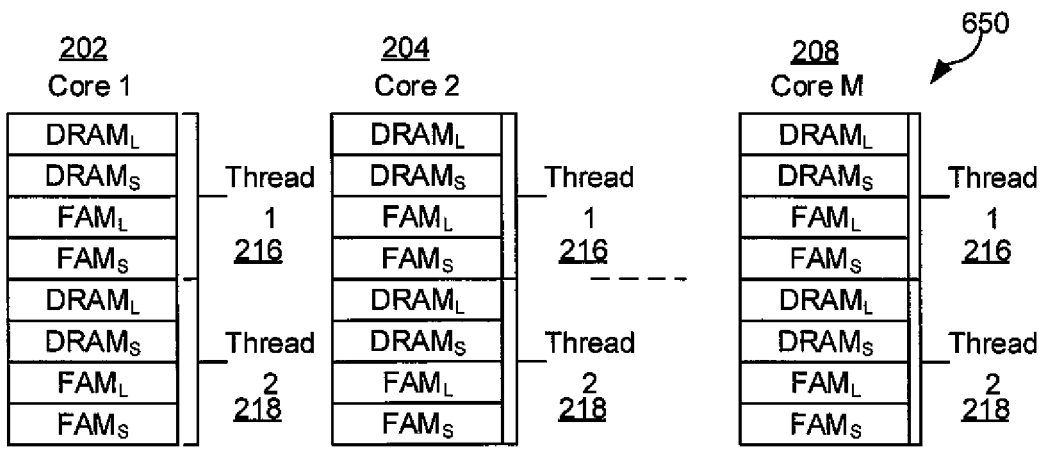
FIG. 6B is an example illustration of hardware counters/registers on a CPU.

FIG. 6A is a flowchart 600 of example logic to implement the tracking and classification for each of the hardware threads 216, 218 of each core 202-208 of CPU 200. FIG. 6B is an example illustration of hardware counters/registers on CPU 200, for each core 202-208 that has DRAM coupled to the first memory interface and FAM memory coupled to the second memory interface. In this example, each core 202-208 has a set of thread specific counters $DRAM_L$, $DRAM_S$, $FAM_L$, and $FAM_S$ that represent the number of DRAM memory loads, the number of DRAM memory stores, the number of FAM memory loads, and the number of FAM memory stores, respectively. These counters/registers are implemented in hardware and only record the number of in-flight memory accesses, which are architecture-visible to code executing on the CPU 200 and do not contain any number of cache-related memory accesses generated by the CPU 200 such as memory reads due to TLB misses or memory writes due to cache evictions. The logic implementing the flowchart 600 may be implemented in firmware modules, state machines, hardware logic, or a combination thereof. In other examples, there may be only a single counter/register that tracks both the loads and stores. In yet other examples, there may be only counter/registers that track the stores such as when dealing with memory types that have very long write latencies.

In block 602, at the beginning of N CPU cycles, the particular counters/registers for each thread are initialized such as by resetting or by storing a default setting. When a memory operation occurs, the physical address of the memory operation is checked to determine if it is directed to the FAM address space or the DRAM address space. Because local DRAM and non-local FAM address spaces are typically separated, a portion of the physical address bits may be used to distinguish whether a load or a store accesses DRAM or FAM. The counters/registers of FIG. 6B are incremented when the physical address of a memory location is known. This normally occurs when a load/store memory operation accesses the L1 cache (instruction or data cache) in the CPU 200 pipeline or after the TLB (translation lookaside buffer) access is resolved. In one example, after a memory operation is committed, its corresponding counter/registers may be decremented in order to only keep track of pending operations.

In block 604, the address bits are checked to determine if a FAM address space is accessed. If so, then in block 606, the memory operation is checked to see if a load operation is being performed. If so, then in block 610 the $FAM_L$ counter/register is incremented otherwise in block 612, the FAMS counter/register is incremented. If in block 604, it was determined that FAM memory was not being accessed but rather DRAM memory, then in block 608, the memory operation is checked to determine if a load operation is being performed. If so, then in block 614 the $DRAM_L$ counter/register is incremented otherwise in block 616 the $DRAM_S$ counter/register is incremented. After the respective counter/registers in blocks 610, 612, 614, and 616 are incremented, flow returns to block 604 to continue tracking for classifying the memory operations.

Figure 7:
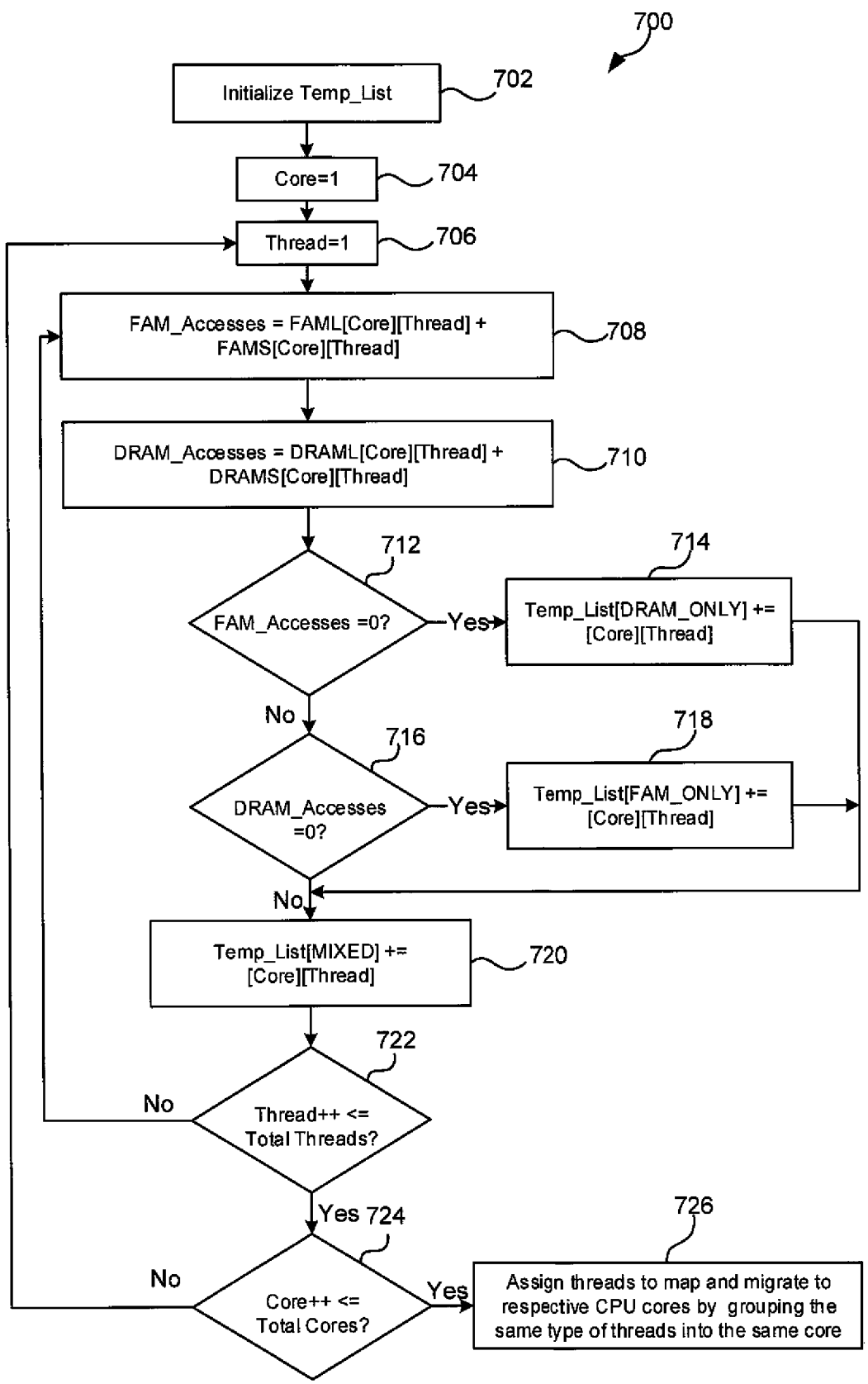
FIG. 7 is an example thread classification flowchart.

FIG. 7 is an example thread classification flowchart 700 that occurs after N CPU 200 clock cycles have occurred and the counters/registers of FIG. 6B contain the latest tracking of recent memory accesses for each thread. In block 702 a temporary list Temp_List is initialized. In block 704 an index to track a particular core is initialized to 1. In block 706, an index to track a particular thread is initialized to 1. In block 708, the total number of FAM memory accesses, FAM_Accesses, is derived by adding the number of operations from the $FAM_L$ counter/register with the number of operations from the FAMS counter/register for the particular current core and thread. Similarly, in block 710, the number of DRAM memory accesses, DRAM_Accesses, is derived by adding the number of operation from the $DRAM_L$ counter/register with the number of $DRAM_S$ counter/register for the particular core and thread. As noted earlier, in some examples, a single counter/register may be used to track both loads and stores for each of the separate DRAM and FAM memory accesses.

In block 712, if the number of FAM_accesses are equal to zero, then in block 714 only DRAM memory accesses have occurred and the particular current core and thread are classified as DRAM_ONLY in the Temp_List indexed by the core and thread indexes. In block 716, if the number of DRAM_Accesses are equal to 0, then in block 718 only FAM memory accesses have occurred and the particular current core and thread is classified as FAM_ONLY in the Temp_List indexed by the core and thread indexes. If there have been both FAM and DRAM memory operations for the particular current core and thread, then in block 720 the thread is classified as MIXED in the Temp_List. In block 722, the thread index is incremented and a check is made to see if all of the threads have been checked for the particular current core. If not, flow continues to block 708 to classify the next thread in the core. If all the threads for the particular current core have been classified, then in block 724, the core index is incremented and a check is made to determine if additional cores need to have their threads classified. If so, flow continues back to block 706 to begin classifying the threads for the next core. If in block 724 it is determined that all threads in all cores of CPU 200 have been classified, then in block 726, the classified list of threads in the Temp_List can be assigned to respective CPU cores by grouping the same types of threads into the same core.

Figure 8:
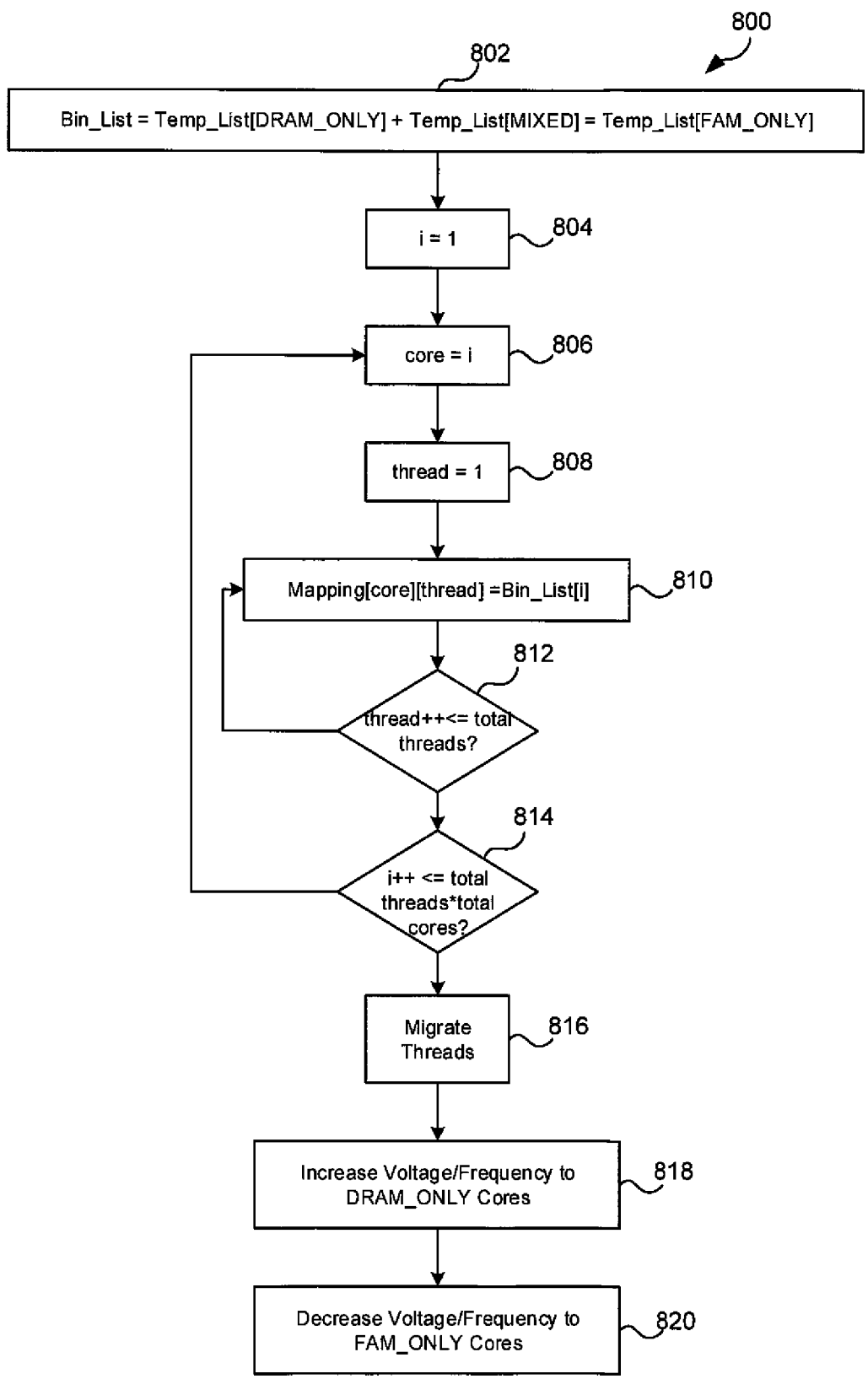
FIG. 8 is an example thread mapping flowchart.

FIG. 8 is an example thread mapping flowchart 800 to assign the threads classified in the Temp_List to actual CPU cores and hardware threads or contexts. In block 802, a Bin_List is created by ordering the DRAM_ONLY classified threads first, then the MIXED classified threads next, and then the FAM_ONLY classified threads last. In other examples, the ordering can occur in differently such as having the FAM_ONLY threads firsts, then the Mixed threads and then the DRAM_ONLY threads last.

Referring back to FIGS. 5A and 5B, assuming that FIG. 5A represents the thread classification after the operation of FIG. 7, then the ordering created in block 802 is represented by the threads represented in FIG. 5B. where the DRAM_ONLY classified threads D1 and D2 are assigned to core C1 and hardware threads T1 and T2 respectively, and DRAM_ONLY classified threads D3 and D4 are assigned to core C2 hardware threads T1 and T2, respectively. The MIXED classified threads M1 and M2 are assigned to core C3 and hardware threads T1 and T2, respectively. The FAM_ONLY classified threads F1 and F2 are assigned to core C4 hardware threads T1 and T2, respectively. After such assigning, the number of cores which have threads of the same type of classification has been maximized as all four cores are hosting software threads of the same type of classification within each core.

Blocks 804-814 are just one example of how the thread mapping may occur for a thread separation controller. The thread separation controller may first generate a thread mapping table (such as FIG. 5A) to map a thread originally running a hardware context (core, thread) to a new context mapping (core, thread such as FIG. 5B). In block 804 and index I for the Bin_List is initialized such as to 1 in this example. In block 806 the core index is set to the Bin_List index i. In block 808 the thread index is initialized to 1 in this example. In block 810 the mapping table indexed by the current core and thread indexes is assigned the classified thread in the Bin_List indexed by the index i. In block 812 the thread index is incremented and checked to determine if all hardware threads (in this example, the total threads per core is 2) have been mapped. If not, flow continues to block 810 to continue mapping. If all the cores hardware threads have been mapped, then in block 814, the index i is incremented and check to see if all cores and hardware threads have been mapped. If not, then flow continues in block 806 where the core index is set to the index i.

If all the cores and their hardware threads have been mapped to the classified threads, then in block 816, the mapped threads are migrated to the respective mapped assignments. This migration can be done in hardware or software such as with an OS thread scheduler. In block 818, after the threads have been migrated, the cores that have DRAM_ONLY classified threads may have their voltage and frequency increased using DVFS. Additionally, in block 820 the cores that have FAM_ONLY classified threads may have their voltage and frequency decreased in order to save power as they are typically stalled waiting for the memory operations to complete. Accordingly, the overall CPU 200 performance can be increased while overall power may be decreased.

The disclosed technique herein allows for any parallel application to be executed by the CPU 200, both multi-threaded and multi-programmed applications. Other thread migration approaches such as thread-shuffling only works for multi-threaded applications. Also, rather than focusing on thread criticality monitored by software instrumentation such as with thread-shuffling, the use of hardware counters/registers at run-time allows for software threads to be classified based on their memory accesses to different types of memory without software involvement. Any software done to perform the actual mapping of the claimed invention can have a substantial reduction in overhead.

In summary for one example, a method for dynamic thread mapping includes several steps. For each thread of a multi-threaded central processing unit (CPU), having multiple cores each having multiple threads, a number of in-flight memory accesses of a first memory and a second memory are tracked. Thread activity of each thread is classified based on the number of in-flight memory accesses to the first memory and the second memory. Each thread is assigned to the multiple cores such that the number of cores having only first memory accesses and the number of cores having only second memory accesses are both maximized. The assigned threads are then migrated to the respective CPU cores.

In another example, a CPU with dynamic thread mapping includes a set of multiple cores, each of the multiple cores includes multiple threads and a set of registers for each of the multiple threads. The set of registers monitor in-flight memory requests by each respective thread to record, the number of loads from and stores to memory. The set of registers is segregated by load from and stores to a first memory interface and a second memory interface. Logic is used to map and migrate each thread to respective CPU cores. The logic maximizes the number of cores accessing only one of the first and second memory interfaces.

The various examples described herein may include logic or a number of components, modules, or constituents. Modules may constitute either software modules, such as code embedded in tangible non-transitory machine readable medium) or hardware modules. A hardware module is a tangible unit capable of performing certain operations and by be configured or arranged in certain manners. In one example, one or more CPUs or one or more hardware modules of a CPU may be configured by firmware (e.g. micro-code or microcontroller) or software (e.g. an application, or portion of an application) as a hardware module that operates to perform certain operations as described herein. For instance, the counter/register may be a hardware counter coupled to a register to allow for reading and writing of the counter contents. In other examples, a register may be read/written by a micro-controller and it is the micro-controller that increments the contents of the register. In yet other examples, a state machine may be used to read the contents of a register, increment the results and store the contents back to the register.

In some examples, a hardware module may be implemented as electronically programmable. For instance, a hardware module may include dedicated circuitry or logic that is permanently configured (e.g. as a special-purpose processor, state machine, a field programmable gate array (FPGA) or an application specific integrated circuit (ASIC) to perform certain operations. A hardware module may also include programmable logic or circuity (e.g. as encompassed within a general purpose processor or other programmable processor) that is temporarily configured by software to perform certain operations. It will be appreciated that the decision to implement a hardware module electronically in dedicated and permanently configured circuitry, or in temporarily configured circuitry (e.g. configured by software) may be driven by cost and time considerations.

A non-transitory computer readable medium allows for tangible non-transient storage of one or more sets of data structures and instructions (e.g. software, firmware, logic) embodying or utilized by any one or more of the methodologies or functions described herein. The instructions may also reside, completely or at least partially, with the static memory, the main memory, and/or within the processor during execution by the computing system. The main memory and the processor memory also constitute computer readable medium. The term "computer readable medium" may include single medium or multiple media (centralized or distributed) that store the one or more instructions or data structures. The computer readable medium may be implemented to include, but not limited to, solid state, optical, and magnetic media whether volatile or non-volatile. Such examples include, semiconductor memory devices (e.g. Erasable Programmable Read-Only Memory (EPROM), Electrically Erasable Programmable Read-only Memory (EEPROM), and flash memory devices), magnetic discs such as internal hard drives and removable disks, magneto-optical disks, and CD-ROM (Compact Disc Read-Only Memory) and DVD (Digital Versatile Disc) disks.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for dynamic thread mapping, comprising:
   initiating a set of thread-specific registers of a multi-threaded central processing unit (CPU) having multiple cores, wherein the set of thread-specific registers comprises a first counter of the set of thread-specific registers for first memory loads and stores and a second counter of the set of thread-specific registers for second memory loads and stores;
   tracking using the first counter a first number of in-flight memory accesses of the first memory;
   tracking using the second counter a second number of in-flight memory accesses of the second memory;
   when a first thread activity is classified as a load operation of the first memory, incrementing the first counter;
   when a second thread activity is classified as a commit operation of the second memory, decrementing the second counter;
   assigning each thread to the multiple cores wherein the number of cores having only first memory accesses and the number of cores having only second memory accesses are both maximized based at least in part on the set of thread-specific registers;
   migrating the assigned threads to the respective CPU cores: and
   adjusting at least one of voltage and frequency to increase the performance of the multiple CPU cores with only first memory accesses and decreasing the performance of the multiple CPU cores with only second memory accesses.

2. The method of claim 1 wherein the tracking is further done by monitoring at least one of translation lookaside buffer access, L1 instruction cache access, and L1 data cache access for each of the multiple cores of the CPU.

3. The method of claim2, wherein the tracking for each thread is done by operating a first set of respective registers of the set of thread-specific registers for each thread for tracking at least one of loads and stores to the first memory and by operating a second set of respective registers of the set of thread-specific registers for tracking at least one of loads and stores to the second memory.

4. The method of claim 3, wherein the first and second sets of respective registers are visible to software executing on the CPU and do not track any number of memory accesses generated by the CPU due to at least one of loads for translation look-aside buffer misses and writes due to evictions from the L1 cache.

5. The method of claim 1, wherein the first memory is coupled to a CPU direct memory bus having a first latency and the second memory is coupled to the CPU via a fabric memory interface having a second latency greater than the first latency.

6. The method of claim 5, further comprising: decreasing performance of cores corresponding with the second memory to increase overall performance of the multi-threaded CPU.

7. The method of claim 5, further comprising: increasing performance of cores corresponding with the first memory to increase overall performance of the multi-threaded CPU.

8. The method of claim 1 where in the classifying thread activity of each thread is performed during runtime of the CPU without associated software executing on the CPU.

9. The method of claim 1, wherein the assigned threads share a same classification and are executed by a same core.

10. The method of claim 1, wherein the tracking using the first counter the first number of in-flight memory accesses of the first memory, assigning each thread to the multiple cores, and migrating the assigned threads to the respective CPU cores are done repetitively for a predetermined period of CPU clock cycles.

11. A central processing unit (CPU) with dynamic thread mapping, comprising:
   a set of multiple cores, each of the multiple cores having,
      multiple threads having in-flight memory requests to physical addresses, and
      a set of registers for each of the multiple threads to monitor the in-flight memory requests, wherein the set of registers comprises a first counter of the set of registers for first memory loads and stores and a second counter of the set of registers for second memory loads and stores, and wherein:
      a first counter tracks a first number of the in-flight memory requests of the first memory interface,
      a second counter tracks a second number of the in-flight memory requests of the second memory interface,
      when a first thread activity is classified as a load operation of the first memory interface, the first counter is incremented, and
      when a second thread activity is classified as a commit operation of the second memory interface, the second counter is decremented; and a circuitry that:
   maps and migrates each thread to respective CPU cores wherein the number of cores accessing only one of the at least first and second memory interfaces is maximized based at least in part on the set of registers; and
   adjusts the voltage and frequency of the CPU cores to maximize performance of the cores with only accesses to the first memory interface, and wherein the adjusting the voltage and frequency is performed periodically over a predetermined period of CPU clock cycles.

12. The CPU of claim 11, wherein the first memory interface is to couple to a first memory having a first latency and the second memory interface is to couple to second memory having a second latency greater than the first latency.

13. The CPU of claim 11, further comprising: an L1 cache in each of the multiple cores coupled to the set of registers; an L2 cache for each of the multiple cores coupled to a respective L1 data cache; and an L3 cache coupled to each of the L2 cache of each the multiple cores and further coupled to the first memory interface and the second memory interface.

14. The CPU of claim 13 wherein the set of registers are visible to software executing on the CPU and wherein the set of registers do not contain any number of memory interface accesses generated by the CPU due to at least one of loads for translation look-aside buffer misses and writes due to evictions from the L1 data cache.

15. The CPU of claim 11 wherein the circuitry is implemented at least partially in software.

16. The CPU of claim 11 wherein the circuitry classifies threads with only first memory interface accesses, threads with only second memory interface accesses, and threads with both first and second memory interface access during runtime of the CPU without associated software executing on the CPU.

17. The CPU of claim 11 wherein the circuitry allows for dynamic thread isolation for both multi-threaded and multi-programmed parallel applications executing on the CPU.

* * * * *